United States Patent
Jeong et al.

(10) Patent No.: US 12,481,755 B2
(45) Date of Patent: Nov. 25, 2025

(54) APPARATUS AND METHOD FOR COLLECTING MALICIOUS CODE META INFORMATION

(71) Applicant: Korea Internet & Security Agency, Naju-si (KR)

(72) Inventors: Jae Han Jeong, Naju-si (KR); Chan Woong Hwang, Naju-si (KR); Jae Gyu Jeon, Naju-si (KR); Woong Go, Naju-si (KR)

(73) Assignee: Korea Internet & Security Agency, Naju-si (KR)

( * ) Notice: Subject to any disclaimer, the term of this patent is extended or adjusted under 35 U.S.C. 154(b) by 186 days.

(21) Appl. No.: 18/438,539

(22) Filed: Feb. 12, 2024

(65) Prior Publication Data
US 2024/0289454 A1 Aug. 29, 2024

(30) Foreign Application Priority Data
Feb. 23, 2023 (KR) .................. 10-2023-0024119

(51) Int. Cl.
*G06F 21/00* (2013.01)
*G06F 16/38* (2019.01)
*G06F 21/56* (2013.01)

(52) U.S. Cl.
CPC ............ *G06F 21/563* (2013.01); *G06F 16/38* (2019.01)

(58) Field of Classification Search
CPC .......................... G06F 21/563; G06F 16/38
See application file for complete search history.

(56) References Cited

U.S. PATENT DOCUMENTS 11,886,585 B1 * 1/2024 Davis .................. G06F 21/566
2017/0139816 A1 * 5/2017 Sapozhnikov ...... G06F 11/3668

OTHER PUBLICATIONS

Kim, Byeongjae et al., "Types of malicious code feature information and system application case study", Journal of the Korea Institute of Information Security and Cryptology, Jun. 2021, vol. 31, No. 3, pp. 81-87.

* cited by examiner

*Primary Examiner* — Jeffrey C Pwu
*Assistant Examiner* — Thong P Truong
(74) *Attorney, Agent, or Firm* — Revolution IP, PLLC (57) ABSTRACT

An apparatus for collecting meta data related to malicious code meta information, includes: an application programming interface (API) key setting unit configured to register as a member of a collection channel related to malicious code of cyber attacks, and set the API key as an initialization input; a collection channel access unit configured to, upon input of the set API key, access the collection channel; an execution command interpretation unit configured to, subsequent to accessing the collection channel, upon input of an execution command, interpret the input execution command; and a meta information management unit configured to, based on API information provided from the collection channel according to the interpreted execution command, extract at least one piece of meta information for identifying an attack group, and manage the at least one piece of meta information in a JSON format for each attack group.

8 Claims, 7 Drawing Sheets

| | A | B |
|---|---|---|
| 1 | CLASSIFI CATION | IOC |
| 2 | MD5 | 02209 1772db14e763fcceeb462d150d1 |
| 3 | MD5 | 02ad715191b64a46120e38ca6cb1ef6a |
| 4 | MD5 | f5fa2b0ac4af67305383 04d564ecc9f0 |
| 5 | MD5 | f91095ae0e632b0f630e0c4eb12ba10 |
| 6 | URLs | http://lockbitapt6vx57t3eeqjofwgcglmutr3a35nygvokja5uuccip4ykyd.onion/ |
| 7 | URLs | http://lockbitsap2oaqhcun3syvbqt6n5nzt7fqosc6jdlmsfleu3ka4k2did.onion/ |
| 8 | URLs | http://lockbitsup4yezcd5enk5unncx3zcy7kw6wllyqmiyhvanj352jayid.onion/ |
| 9 | URLs | https://bigblog.at/ |
| 10 | URLs | https://decoding.at/ |

FIG. 5

```
{
"query_status": "ok",
"data": [{
"sha256_hash": "b4aabfb8f032737 0ce80970c357b84782eaf0aabfc70f5e734072
"sha3_384_hash": "c0e10a1a5b0bf5367da01d39251bb24c0b0aa25bee5c39a35a8f
"sha1_hash": "9771336620269 14e6defc4dfcbdf430785f407",
"md5_hash": "1a96767957e193c45b1bf642f3293350",
"first_seen": "2022-06-16 04:33:48",
"last_seen": "2022-06-16 05:34:20",
"file_name": "",
"file_size": 116224,
"file_type_mime": "application/x-dosexec",
"file_type": "exe",
"reporter": "JAMESWT_MHT",
"origin_country": "IT",
```

APPARATUS AND METHOD FOR COLLECTING MALICIOUS CODE META INFORMATION

CROSS REFERENCE TO RELATED APPLICATIONS

This application claims priority to and the benefit of Korean Patent Application No. 10-2023-0024119 filed on Feb. 23, 2023, the disclosure of which is incorporated herein by reference in its entirety.

BACKGROUND OF THE INVENTION

1. Field of the Invention

The present invention relates to an apparatus and method for collecting malicious code meta information capable of more accurately collecting data that is useful for analyzing malicious code by utilizing application programming interface (API) information related to malicious code during a cyber attack.

2. Discussion of Related Art

The number of infringement incidents utilizing open-source malicious code and automated malicious code creation tools is rapidly increasing every year, with the majority being caused by malicious code. Following this trend, businesses and organizations are actively applying and researching various techniques, including artificial intelligence (AI), to efficiently analyze and respond to a sudden increase in malicious code.

In this case, it is required to accurately identify the characteristics of malicious code and infringement incidents, but the scope of malicious code analysis is limited and substantial analysis information is absent. Recently, various channels have been providing application programming interface (API) information related to malicious code for analysis of the malicious code.

However, since the API information is shared through a large number of repositories through various channels, the data is also enormous, so it is difficult to classify data related to malicious code.

For example, a system for identifying malicious code repositories on Github was proposed to collect various types of malicious code. Github is the largest software storage and sharing platform, with more than 34 million users and 32 million public repositories as of October 2019. Among the repositories, there are thousands of repositories containing malicious code. In order to collect malicious code in Github, a query with a series of keywords is written using the Github Search API and a list of highly relevant repositories is only obtained, thus it is difficult to find the API information needed for malicious code analysis, and the mainstream of the technology mainly provides malicious code detection techniques using API information.

RELATED ART DOCUMENTS

Journal of the Korea Institute of Information Security and Cryptology, Vol. 31, No. 3 (June 2021: Types of malicious code feature information and system application case study).

SUMMARY OF THE INVENTION

The present invention is directed to providing provide an apparatus and method for collecting malicious code meta information capable of further collecting meta information associated with feature information for advancement of infringement incident analysis According to an aspect of the present invention, there is provided an apparatus for collecting malicious code meta information, the apparatus including: an application programming interface (API) key setting unit configured to register as a member of a collection channel related to malicious code of cyber attacks so as to be issued an API key from the collection channel, and set the API key as an initialization input; a collection channel access unit configured to, upon input of the set API key, access at least one collection channel, for which registration as a member has been made, through the API key; an execution command interpretation unit configured to, subsequent to accessing the collection channel, upon input of an execution command for collecting meta information related to malicious code by the administrator, interpret the input execution command; and a meta information management unit configured to, based on API information provided from the collection channel according to the interpreted execution command, extract at least one piece of meta information for identifying an attack group, and manage the at least one piece of meta information in a JSON format for each attack group.

The execution command interpretation unit may include: an input parameter recognition unit configured to, upon indicator of compromise (IOC) information related to the malicious code being input as an input parameter in the execution command, recognize the input parameter; an IOC list loading unit configured to, when the recognized input parameter is a file format, load IOC list information including a hash value, an internet protocol (IP) value, a domain value, and a uniform resource locator (URL) value preset in the file format; an input value identification unit configured to identify at least one IOC value selected from the hash value, the IP value, the domain value, and the URL value in the loaded IOC list information loaded in the file format; a type identification unit configured to, when the recognized input parameter is a single piece of IOC information, identify a type of the single piece of IOC information; and a request value generation unit configured to generate a request value for each collection channel according to the identified IOC value and the identified type.

The meta information management unit may be configured to transmit the generated request value to each corresponding collection channel, and store at least one piece of meta information extracted as a response to the transmission in a JSON format in a folder generated for each collection channel.

The collection channel may include a VirusTotal channel, an Abuse.ch—Malware Bazaar channel, an Abuse.ch—URL Haus channel, and an OTX channel.

The Abuse.ch—Malware Bazaar channel may not operate when the request value corresponds to the IP value, the domain value, and the URL value.

The apparatus may further include a log record management unit configured to store log information processed by the API key setting unit, the collection channel access unit, the execution command interpretation unit, and the meta information management unit.

The log record management unit may delay processing for a preset time when the Virustotal channel is not executed for the first time, and may be configured to, when the number of the at least one piece of meta information related to the Virustotal channel exceeds 500, generate a log alarm related thereto.

The request value may operate as a thread in the order of the remaining collection channels excluding the Virustotal channel.

According to another aspect of the present invention, there is provided a method of collecting meta information related to malicious code by an apparatus for collecting malicious code meta information, the method including the steps of: (a) registering as a member of a collection channel related to malicious code of cyber attacks to be issued an API key from the collection channel, and setting the API key as an initialization input; (b) upon input of the set API key, accessing the collection channel; (c) subsequent to accessing the collection channel, upon input of an execution command for collecting meta information related to malicious code by an administrator, interpreting the input execution command; and (d) based on API information provided from the collection channel according to the interpreted execution command, extracting at least one piece of meta information for identifying an attack group, and managing the at least one piece of meta information in a JSON format for each attack group, The step (c) may include: (c-1) upon indicator of compromise (IOC) information related to the malicious code being input as an input parameter in the execution command, recognizing the input parameter; (c-2) when the recognized input parameter is a file format, loading IOC list information including a hash value, an internet protocol (IP) value, a domain value, and a uniform resource locator (URL) value preset in the file format; (c-3) identifying at least one IOC value selected from the hash value, the IP value, the domain value, and the URL value in the loaded IOC list information loaded in the file format; and (c-4) when the recognized input parameter is a single piece of IOC information, identifying a type of the single piece of IOC information; and (c-5) generation a request value for each collection channel according to the identified IOC value and the identified type.

The step (d) may include transmitting the generated request value to each corresponding collection channel, and storing at least one piece of meta information extracted as a response to the transmission in a JSON format in a folder generated for each collection channel.

BRIEF DESCRIPTION OF DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

The embodiments to be described in this specification and the configurations shown in the drawings are only preferred examples of the disclosed invention, and at the time of filing this application, there may be various modifications that can replace the embodiments and drawings in this specification.

The terminology used herein is for the purpose of only describing embodiments and is not intended to restrict and/or limit the invention. As used herein, the singular forms are intended to include the plural forms as well, unless the context clearly indicates otherwise. In particular, in the following, each terminal is expressed as a singular number, but it should be understood to mean a plural number in practice.

It will be further understood that the terms "comprises," "comprising," "includes" and/or "including" used herein specify the presence of stated features, integers, steps, operations, elements, and/or components, but do not preclude the presence or addition of one or more other features, integers, steps, operations, elements, components, and/or groups thereof.

In addition, the term "~unit" may refer to a unit for processing at least one function or operation. For example, the term "~unit" may refer to at least one piece of hardware, such as a field programmable gate array (FPGA)/application specific integrated circuit (ASIC), at least one piece of software stored in a memory, or at least one process processed by a processor.

Hereinafter, an embodiment of the disclosed invention will be described in detail by comparison with the existing collection apparatus with reference to the accompanying drawings.

Figure 1:
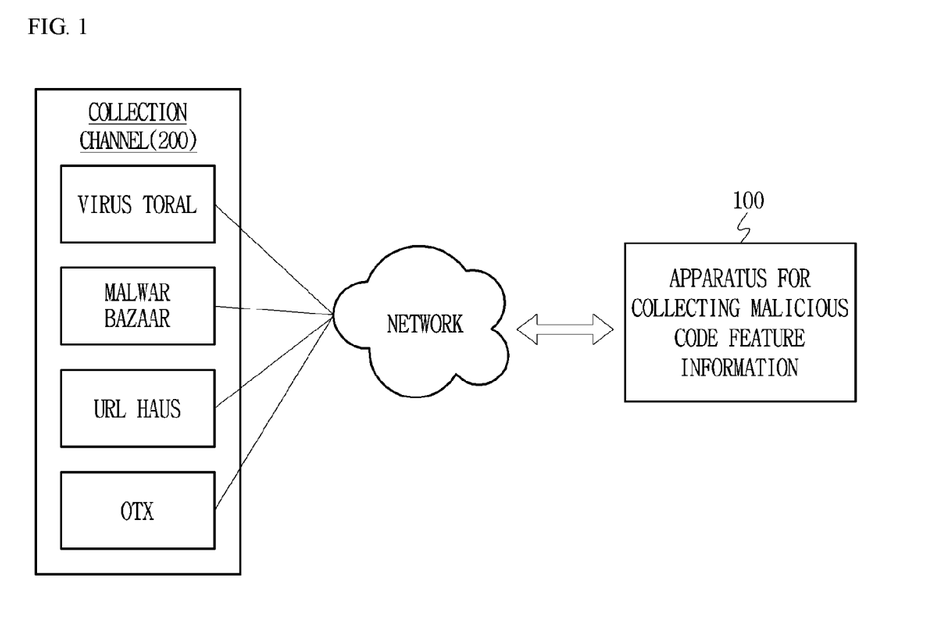
FIG. 1 is a block diagram illustrating the existing apparatus for collecting feature information related to malicious code.

FIG. 1 is a block diagram illustrating the existing apparatus for collecting feature information related to malicious code.

Referring to FIG. 1, the existing apparatus 100 for collecting malicious code feature information collects application programming interface (API) information from at least one collection channel 200 connected through a network and extracts a total of 72 types of feature information from the collected API information according to six categories (metadata, static information, dynamic information, network information, ATT&CK framework, and other information) based on types of detailed information about malicious code, normalizes the extracted feature information through AI learning, and provides data optimized for malicious code detection.

However, with only the feature information as described above, there is difficulty in improving the accuracy of analysis of newly emerging malicious code. To resolve this issue, the following apparatus for collecting malicious code meta information is disclosed.

Figure 2:
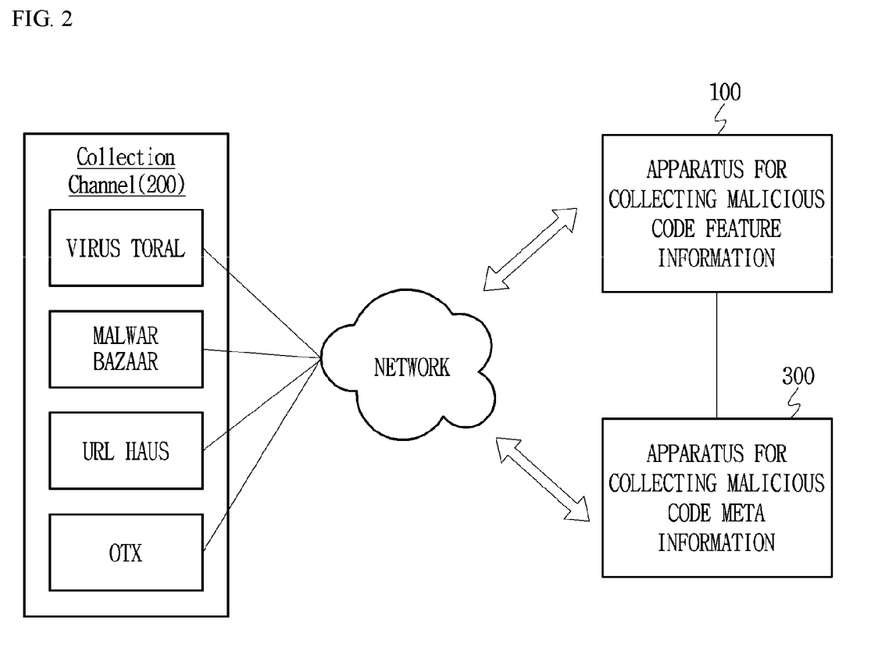
FIG. 2 is a diagram illustrating a connection status of an apparatus for collecting malicious code meta information according to an embodiment of the present invention.
Figure 3:
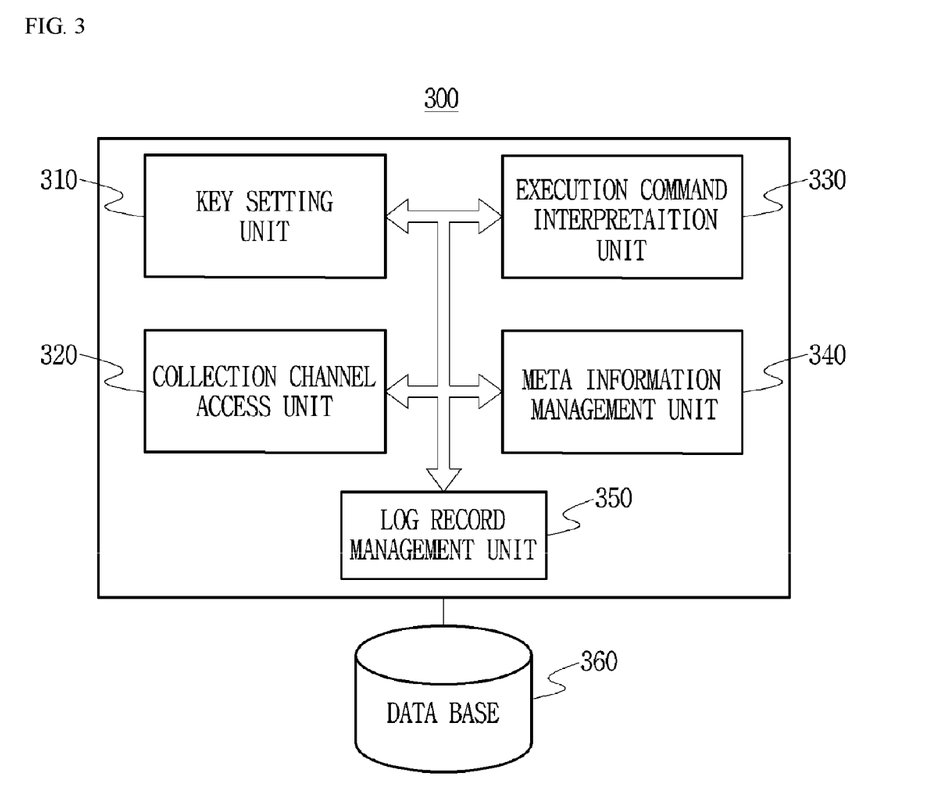
FIG. 3 is a diagram specifically illustrating the configuration of the apparatus for collecting malicious code meta information shown in FIG. 2.

FIG. 2 is a diagram illustrating a connection status of an apparatus for collecting malicious code meta information according to an embodiment of the present invention, and FIG. 3 is a diagram specifically illustrating the configuration of the apparatus for collecting malicious code meta information shown in FIG. 2.

Referring to FIGS. 2 and 3, an apparatus for collecting malicious code meta information 300 according to an embodiment may be linked with the above-described apparatus 100 for collecting malicious code feature information to receive feature information from the apparatus 100 for collecting malicious code feature information, and may register as a member of at least one collection channel 200 connected to the network to be issued an API key.

The network refers to a connection structure enabling information exchange between nodes connected to the apparatus 300 for collecting malicious code meta information and the at least one collection channel 200. Examples of the network may include a local area network (LAN) and a wired data communication network in a narrow sense, and include a wide area network (WAN), an Internet network (WWW: World Wide Web), a WiBro network, and a mobile communication network in a broad sense, but is not limited thereto.

The apparatus 300 for collecting malicious code meta information connected to the at least one collection channel 200 through the network may include an API key setting unit 310, a collection channel access unit 320, an execution command interpretation unit 330, a meta information management unit 340, a log record management unit 350, and a database 360.

In an embodiment, the API key setting unit 310 may register as a member of the collection channel 200 related to malicious code for cyber attacks through the network to receive an API key from the collection channel 200 and set the API key as an initialization input.

The collection channel 200 may include a VirusTotal channel, an Abuse.ch—Malware Bazaar channel, an Abuse.ch—URL Haus channel, and an OTX channel. Each of the VirusTotal channel, the Abuse.ch—Malware Bazaar channel, the Abuse.ch—URL Haus channel, and the OTX channel may contain multiple public repositories. Data stored in the multiple public repositories may represent various types of data, including data containing malicious code.

The collection channel access unit 320 according to an embodiment may, upon the set API key being input by an administrator, access at least one collection channel 200, for which registration as a member has been made, through the input API key.

The execution command interpretation unit 330 according to an embodiment may, subsequent to accessing the at least one collection channel 200, upon input of an execution command for collecting meta information related to malicious code by the administrator, interpret the input execution command to drive the input execution command.

The input execution command refers to a command for collecting meta information in addition to feature information. For example, the input execution command may refer to a multi-thread operation of, subsequent to input of IOC information as an input parameter, collecting meta information in addition to feature information according to an IOC value of IOC information or a type of IOC information.

The multi-thread operation may refer to an operation for requesting meta information in accordance with the order of at least one preset collection channel 200.

Here, the meta information may be distinguished from the existing meta data of FIG. 1. That is, the metadata described in FIG. 1 refers to a hash value, basic information, and compilation information of a file. The hash value is a value derived from a hash algorithm, such as MD5, SHA1, and SHA256, and is a simple but reliable signature value that may identify malicious code. On the other hand, the basic information may include a file size, a file name, an entropy, a time stamp, and the like, and even with the difficulty in identifying malicious code with a single piece of basic information, it is a way to identify malicious code by combining information. On the other hand, the compilation information refers to a packer, a development language, and compiler information used to generate malicious code.

However, the meta information described in the embodiment is information related to IOC (indicator of compromise; hash, IP, domain, URL) information, and may refer to information added to the existing feature information.

A detailed description of the execution command interpretation unit 330 is described below with reference to FIG. 4.

In an embodiment, the meta information management unit 340 may, based on API information provided from at least one collection channel 200 according to the execution command interpreted by the execution command interpretation unit 330 described above, extract at least one piece of meta information related to the type or IOC value of IOC information for identifying an attack group, and store the at least one piece of meta information in a JSON format for each attack group such that the at least one piece of meta information is managed in a JSON format.

In this case, the API information may refer to information received from the apparatus 100 for collecting malicious code feature information shown in FIG. 1 or directly collected from the at least one collection channel 200 according to an execution command, and such at least one collection channel 200 may, as a software storage and sharing platform, include not only thousands of repositories containing malicious code, but also repositories in which various types of software are stored.

In an embodiment, the log record management unit 350 may not only store log information processed by the API key setting unit 310, the collection channel access unit 320, the execution command interpretation unit 330, and the meta information management unit 340 in the memory or database 360, but also store log information about processing data exchanged between the apparatus 300 for collecting malicious code meta information and the at least one collection channel 200 in the memory or database 360.

The memory 360 may include cache, a read only memory (ROM) or a random access memory (RAM), or a combination thereof, and the database 360 is a concept including a computer-readable recording medium, and refers to a database in a narrow sense and a database including data records based on a file system in a broad sense, and even a simple set of logs may be included within the scope of the database according to the present invention when data may be extracted by searching the set of logs.

Figure 4:
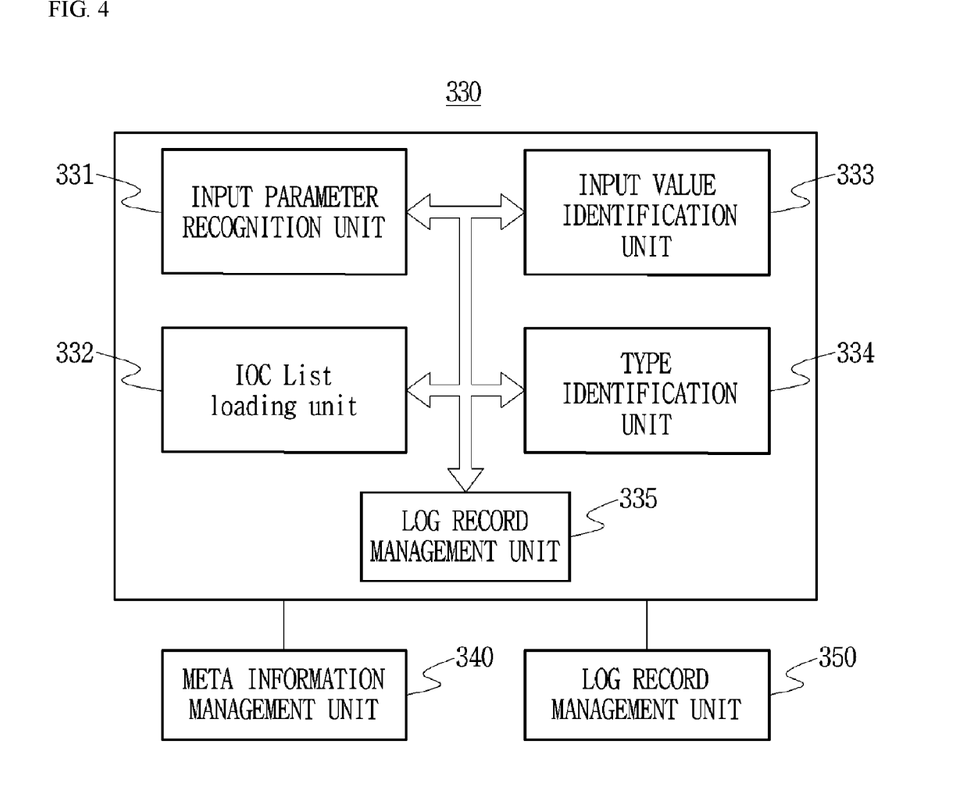
FIG. 4 is a diagram specifically illustrating an execution command interpretation unit of the apparatus for collecting malicious code meta information according to an embodiment of the present invention.

FIG. 4 is a diagram specifically illustrating an execution command interpretation unit of the apparatus for collecting malicious code meta information according to an embodiment of the present invention.

Referring to FIG. 4, the execution command interpretation unit 330 according to an embodiment may include an input parameter recognition unit 331, an IOC list loading unit 332, an input value identification unit 333, a type identification unit 334, and a request value generation unit 335.

In an embodiment, the input parameter recognition unit 331 may, upon IOC information related to malicious code being input by the administrator as an input parameter in the execution command, recognize the input parameter.

The IOC list loading unit 332 may, when the input parameter recognized by the input parameter recognition unit 331 is a file format, load IOC list information including a hash value, an internet protocol (IP) value, a domain value, and a uniform resource locator (URL) value preset in the file format.

Figure 5:
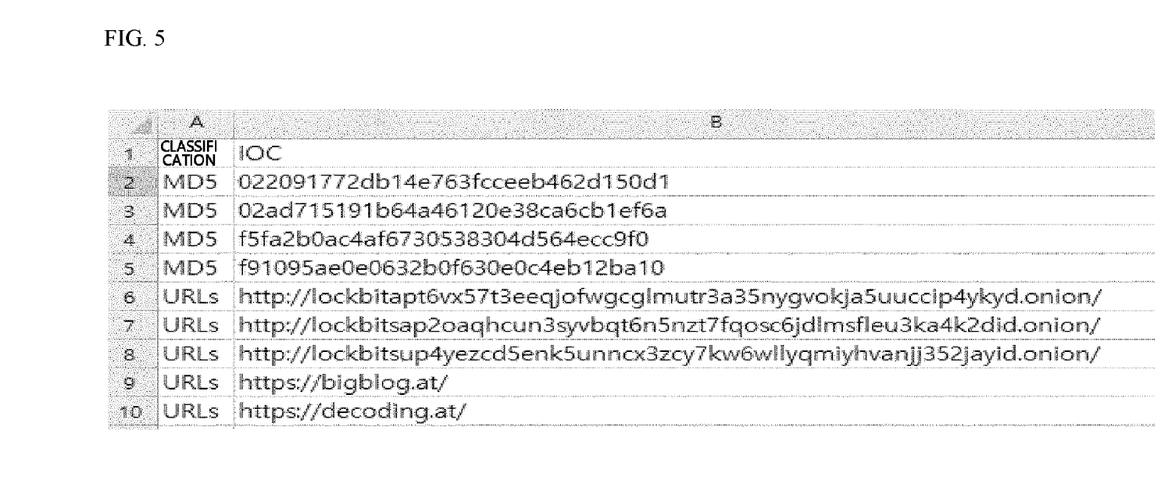
FIG. 5 is a diagram illustrating an Excel file in which multiple indicator of compromise (IOC) values are input as input parameters according to an embodiment of the present invention.

In this case, the file format may be an Excel file format. The Excel file format may be shown as shown in FIG. 5, in which at least one value among a plurality of hash, IP, domain, and URL values is entered as input parameters and recorded.

Here, the execution command reflecting the input parameters may be, for example, kisa {file name/IOC}-gn {name of attack group to be set}.

In an embodiment, the input value identification unit 333 may identify at least one IOC value selected from the hash value, the IP value, the domain value, and the URL value, which are input as input parameters, in the loaded IOC list information loaded in the file format.

On the other hand, the type identification unit 334 may, when the input parameter recognized by the input parameter recognition unit 331 is a single piece of IOC information, identify the type of the single piece of IOC information. In this case, the type of IOC information may refer to STRING, INTEGER, and DICTIONARY formats related to hash, IP, domain, and URL.

Subsequently, the request value generation unit 335 according to an embodiment may generate a request value for each collection channel according to the IOC value and the type identified by the input value identification unit 333 and the type identification unit 334, respectively.

The generated request value may operate as a multi-thread pool in the order of the remaining collection channels excluding the Virustotal channel, among the at least one collection channel 200, for example, in any order of the Abuse.ch—Malware Bazaar channel, the Abuse.ch—URL Haus channel, and the OTX channel.

In this case, the reason for excluding the Virustotal channel is that the Virustotal channel handles only a maximum of 500 requests once every 4 seconds, and thus does not operate as a multi-thread pool.

Such a request value may be used in the meta information management unit 340 described in FIGS. 2 and 3.

That is, the meta information management unit 340 according to an embodiment may transmit the request value, which operates as a multi-thread pool, to each corresponding collection channel 200, and as a response to the transmission, extract at least one piece of meta information for each API information provided from each individual collection channel 200, and store the extracted at least one piece of meta information in a JSON format in a folder generated for each collection channel 200.

For example, the extracted meta information may be stored and managed in the form of KISA/{Attack Group Name}/{Detailed API UPON IOC Request}.json in the path in which the command was executed. As an example, the JSON format that is finally output in relation to the at least one piece of meta information may be illustrated in FIG. 6.

Here, the reason for transmitting the request value to each corresponding collection channel 200 is that, for example, the Abuse.ch—Malware Bazaar channel doe not operate when the request value corresponds to the IP, Domain, and URL values.

Meanwhile, since the Virustotal channel, which is capable of only a maximum of 500 requests per second, does not operate as a multi-thread pool, delayed processing is inevitable compared to other collection channels.

To this end, the log record management unit 350 of the apparatus 300 for collecting malicious code meta information according to an embodiment may delay processing for a preset time when the Virustotal channel is not executed for the first time, and may, when the number of the at least one piece of meta information extracted in association with the Virustotal channel exceeds 500, generate a log alarm related thereto. The log alarm may be managed by the administrator.

Meanwhile, each of the components described in FIGS. 3 and 4 may be a hardware module or a software component module, and may be processed by at least one processor.

The above described at least one processor may include hardware components, such as a micro processing unit (MPU) or central processing unit (CPU), a cache memory, and a data bus.

Figure 7:
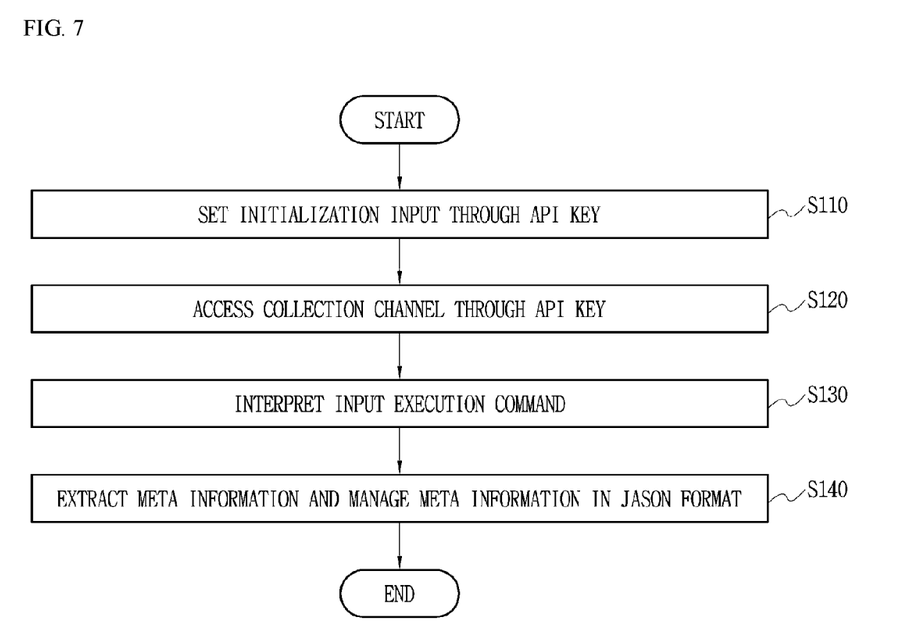
FIG. 7 is a flowchart showing a method of collecting malicious code meta information according to an embodiment of the present invention.

FIG. 7 is a flowchart showing a method of collecting malicious code meta information according to an embodiment of the present invention.

Referring to FIG. 7, a method of collecting malicious code meta information according to an embodiment may be performed by an apparatus for collecting malicious code meta information, the apparatus for collecting malicious code meta information may be connected to at least one collection channel through a network, and by utilizing API information provided from the collection channel, meta information in addition to feature information related to malicious code may be extracted. To this end, the apparatus for collecting malicious code meta information performs operations S110 to S140.

In this case, the apparatus for collecting malicious code meta information may include at least one memory and a controller, and operations S110 to S140 may be substantially performed by the controller.

First, in operation S110, the controller may register as a member of a collection channel related to malicious code of a cyber attack through a network to be issued an API key from the collection channel 200 and set the API key as an initialization input.

In operation S120, the controller may, upon the set API key being input by an administrator, access at least one collection channel 200, for which registration as a member has been made, through the input API key.

In operation S130, the controller may, subsequent to accessing the at least one collection channel 200, upon input of an execution command for collecting meta information related to malicious code by the administrator, interpret the input execution command, and drive the input execution command.

The input execution command refers to a command for collecting meta information in addition to feature information. For example, the input execution command may refer to a multi-thread operation of, upon input of indicator of compromise (IOC) information as an input parameter, collecting meta information in addition to feature information according to an IOC value of IOC information or a type of IOC information.

The multi-thread operation may refer to an operation for requesting meta information in accordance with the order of at least one preset collection channel 200.

The meta information may be distinguished from the existing meta data of FIG. 1. That is, the metadata described in FIG. 1 refers to a hash value, basic information, and compilation information of a file. The hash value is a value derived from a hash algorithm, such as MD5, SHA1, and SHA256, and is a simple but reliable signature value that may identify malicious code. On the other hand, the basic information may include a file size, a file name, an entropy, a time stamp, and the like, and even with the difficulty in identifying malicious code with a single piece of basic information, it is a way to identify malicious code by combining information. On the other hand, the compilation information refers to a packer, a development language, and compiler information used to generate malicious code.

However, the meta information described in the embodiment is information related to IOC (indicator of compromise; hash, IP, domain, URL) information, and may refer to information added to the existing feature information.

In operation S140, the controller may, based on API information provided from the at least one collection channel 200 according to the execution command processed in operation S130, extract at least one piece of meta information related to a type or an IOC value of IOC information for identifying an attack group, store the extracted at least one piece of meta information in a JSON format for each attack group such that the extracted at least one piece of meta information is managed in a JSON format.

Hereinafter, the above-described operation S130 will be described in detail.

Figure 8:
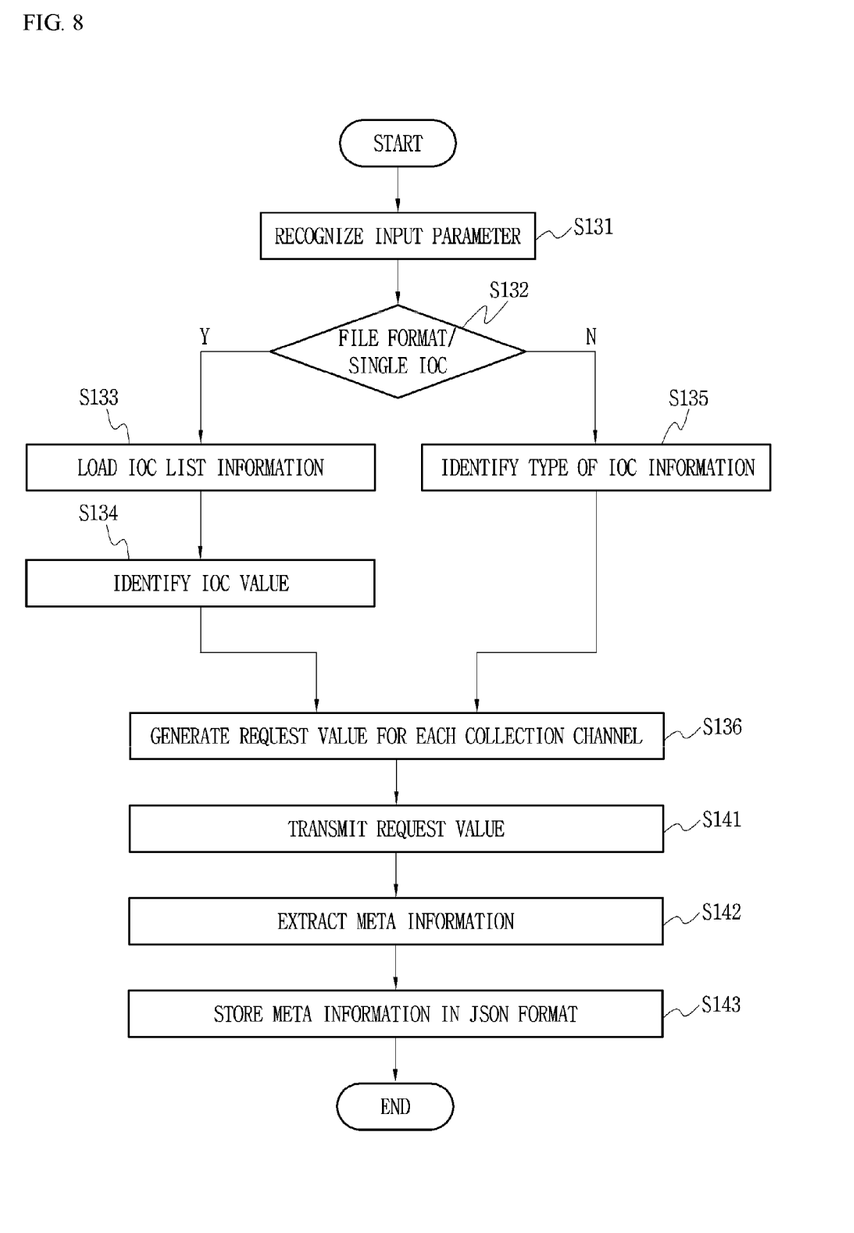
FIG. 8 is a flowchart specifically showing operation S130 performed by a controller according to an embodiment of the present invention.

FIG. 8 is a flowchart specifically showing operation S130 performed by a controller according to an embodiment of the present invention.

Referring to FIG. 8, the controller according to an embodiment may include operations S131 to S136 to process an execution command in the background.

First, in operation S131, the controller may, when IOC information related to malicious code is input as an input parameter in an execution command, recognize the input parameter.

In operation S132, the controller may determine whether the input parameter recognized in operation S131 described above is a file format or single piece of IOC information.

For example, the controller may, when the recognized input parameter is a file format (Y), load IOC list information including hash, IP, domain, and URL values that are preset in the file format (S133).

In this case, the file format may be an Excel file format. The Excel file format may be shown as shown in FIG. 5, in which at least one value among a plurality of hash, IP, domain, and URL values is entered as input parameters and recorded.

For example, the execution command reflecting the input parameters may be, for example, kisa {file name/IOC}-gn {name of attack group to be set}.

In operation S134, the controller may identify at least one IOC value selected among the hash, IP, domain, and URL values, which are input as input parameters in the IOC list information loaded in the file format.

On the other hand, in operation S132, the controller may, when the input parameter recognized in operation S131 is a single piece of IOC information (N), identify the type of the single piece of IOC information (S135).

In this case, the type of IOC information may refer to STRING, INTEGER, and DICTIONARY formats related to hash, IP, domain, and URL.

Subsequently, in operation S136, the controller may generate a request value for each collection channel according to the IOC value and the type identified in operation S134 and operation S135, respectively.

The generated request value may operate as a multi-thread pool in the order of the remaining collection channels excluding the Virustotal channel, among the at least one collection channel 200, for example, in any order of the Abuse.ch—Malware Bazaar channel, the Abuse.ch—URL Haus channel, and the OTX channel.

In this case, the reason for excluding the Virustotal channel is that the Virustotal channel handles only a maximum of 500 requests once every 4 seconds, and thus does not operate as a multi-thread pool.

The request value may be used in operation S140 described in FIG. 7.

That is, the controller transmits the request value, which operates as a multi-thread pool, to each corresponding collection channel 200 (S141), and as a response to the transmission, extract at least one piece of meta information for each API information provided from each individual collection channel 200 (S142), and store the extracted at least one piece of meta information in a JSON format in a folder generated for each collection channel 200 (S143).

Figure 6:
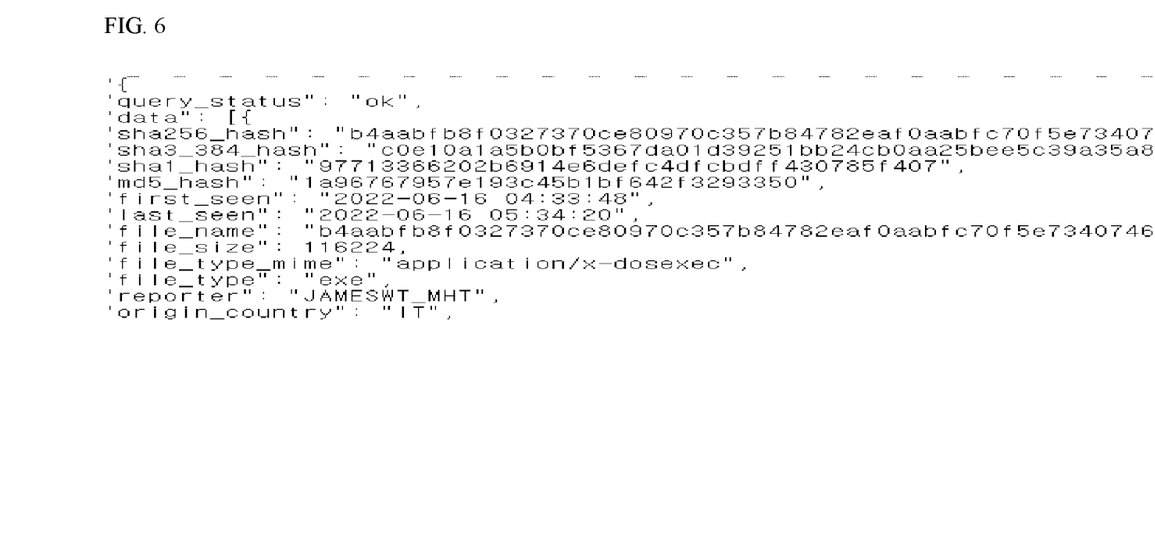
FIG. 6 is a diagram illustrating a JSON file outputting additional meta information according to an embodiment of the present invention.

For example, the extracted meta information may be stored and managed in the form of KISA/{Attack Group Name}/{Detailed API UPON IOC Request}.json in the path in which the command was executed. As an example, the JSON format that is finally output in relation to the at least one meta information may be illustrated as shown in FIG. 6.

Here, the reason for transmitting the request value to each corresponding collection channel 200 is that, for example, the Abuse.ch—Malware Bazaar channel does not operate when the request value corresponds to the IP, Domain, and URL values.

Meanwhile, since the Virustotal channel, which is capable of only a maximum of 500 requests per second, does not operate as a multi-thread pool, delayed processing is inevitable compared to other collection channels.

The operations of the method of collecting malicious code meta information described above with reference to FIGS. 7 and 8 may be implemented in the form of program instructions and may be recorded on a computer readable medium.

The computer readable medium may include program instructions, data files and data structures alone or in combination. The program instructions recorded on the computer readable medium may be specially designed and configured for the present invention or may be usable by a skilled person in the field of computer software. Computer readable record media include magnetic media such as a hard disk, a floppy disk, or a magnetic tape, optical media such as a compact disc read only memory (CD-ROM) or a digital video disc (DVD), magneto-optical media such as floptical disks, and hardware devices such as a ROM, a random access memory (RAM), or a flash memory specially designed to store and execute programs. Examples of the program instructions include not only machine language code made by a compiler but also high level code that may be used by an interpreter etc., which is executed by a computer. The hardware devices may be configured to operate as one or more software modules in order to perform the operations of the present invention, or vice versa.

As is apparent from the above, an embodiment of the present invention is implemented to further extract meta information, in addition to feature information, from API information provided by four collection channels (Virustotal, Malware Bazaar, URLhaus, and OTX) for each attack group, thereby increasing the accuracy of infringement analysis, rapidly preventing infringement incidents, and effectively responding to infringement.

In other words, an embodiment of the present invention is implemented to further extract meta information, in addition to feature information, from API information for each attack group, thereby significantly shortening the time required for malicious code analysis through advanced malicious code analysis (infringement analysis accuracy, etc.) and detecting infringement incidents in advance.

The effects of the present disclosure are not limited to the effects described above, and other effects that are not described will be clearly understood by those skilled in the art from the following description.

While the invention has been shown and described with respect to particulars, such as specific components, embodiments, and drawings, the embodiments are used to aid in the understanding of the present invention rather than limiting the present invention, and those skilled in the art should appreciate that various changes and modifications are possible without departing from the spirit and scope of the invention.

Therefore, the spirit of the present invention is not defined by the above embodiments but by the appended claims of the present invention, and the scope of the present invention is to cover not only the following claims but also all modifications and equivalents derived from the claims.

The invention claimed is:

1. An apparatus for collecting malicious code meta information, the apparatus comprising:
    an application programming interface (API) key setting unit configured to register as a member of a collection channel related to malicious code of cyber attacks so as to be issued an API key from the collection channel, and set the API key as an initialization input;
    a collection channel access unit configured to, upon the set API key being input by an administrator, access at least one collection channel, for which registration as a member has been made, through the API key;
    an execution command interpretation unit configured to, subsequent to accessing the collection channel, upon input of an execution command for collecting meta information related to malicious code by the administrator, interpret the input execution command; and
    a meta information management unit configured to receive malicious code feature information provided from the collection channel according to the interpreted execution command, register as a member of at least one collection channel connected to a network so as to be issued an API key to extract meta information, and manage the meta information in a JSON format for each attack group,
    wherein the execution command interpretation unit includes:
    an input parameter recognition unit configured to, upon indicator of compromise (IOC) information related to the malicious code being input as an input parameter in the execution command, recognize the input parameter;
    an IOC list loading unit configured to, when the recognized input parameter is a file format, load IOC list information including a hash value, an internet protocol (IP) value, a domain value, and a uniform resource locator (URL) value preset in the file format;
    an input value identification unit configured to identify at least one IOC value selected from the hash value, the IP value, the domain value, and the URL value in the loaded IOC list information loaded in the file format;
    a type identification unit configured to, when the recognized input parameter is a single piece of IOC information, identify a type of the single piece of IOC information; and
    a request value generation unit configured to generate a request value for each collection channel according to the identified IOC value and the identified type.

2. The apparatus of claim 1, wherein the meta information management unit is configured to transmit the generated request value to each corresponding collection channel, and store at least one piece of meta information extracted as a response to the transmission in a JSON format in a folder generated for each collection channel.

3. The apparatus of claim 1, wherein the collection channel includes a VirusTotal channel, an Abuse.ch—Malware Bazaar channel, an Abuse.ch—URL Haus channel, and an OTX channel.

4. The apparatus of claim 3, wherein the Abuse.ch—Malware Bazaar channel does not operate when the request value corresponds to the IP value, the domain value, and the URL value.

5. The apparatus of claim 1, further comprising a log record management unit configured to store log information processed by the API key setting unit, the collection channel access unit, the execution command interpretation unit, and the meta information management unit.

6. The apparatus of claim 5, wherein the log record management unit is delays processing for a preset time when the Virustotal channel is not executed for the first time, and is configured to, when the number of the at least one piece of meta information related to the Virustotal channel exceeds 500, generate a log alarm related thereto.

7. A method of collecting meta information related to malicious code by an apparatus for collecting malicious code meta information, the method comprising the steps of:
    (a) registering as a member of a collection channel related to malicious code of cyber attacks to be issued an API key from the collection channel, and setting the API key as an initialization input;
    (b) accessing, upon input of the set API key, at least one collection channel, for which registration as a member has been made, through the API key;
    (c) subsequent to accessing the collection channel, upon input of an execution command for collecting meta information related to malicious code by an administrator, interpreting the input execution command; and
    (d) utilizing API information provided from the collection channel according to the interpreted execution command to extract at least one piece of meta information for identifying an attack group related to malicious code, and managing the at least one piece of meta information in a JSON format for each attack group,
    wherein the step (c) includes:
    (c-1) upon indicator of compromise (IOC) information related to the malicious code being input as an input parameter in the execution command, recognizing the input parameter;
    (c-2) when the recognized input parameter is a file format, loading IOC list information including a hash value, an internet protocol (IP) value, a domain value, and a uniform resource locator (URL) value preset in the file format;
    (c-3) identifying at least one IOC value selected from the hash value, the IP value, the domain value, and the URL value in the loaded IOC list information loaded in the file format; and
    (c-4) when the recognized input parameter is a single piece of IOC information, identifying a type of the single piece of IOC information; and
    (c-5) generation a request value for each collection channel according to the identified IOC value and the identified type.

8. The method of claim 7, wherein the step (d) includes
transmitting the generated request value to each corresponding collection channel, and storing at least one piece of meta information extracted as a response to the transmission in a JSON format in a folder generated for each collection channel.

\* \* \* \* \*